United States Patent [19]
Knutsen

[11] 4,197,454
[45] Apr. 8, 1980

[54] FIBER OPTIC LASER BEAM DETECTOR

[75] Inventor: Wallace Knutsen, Silver Spring, Md.

[73] Assignee: The United States of America as represented by the Secretary of the Navy, Washington, D.C.

[21] Appl. No.: 954,707

[22] Filed: Oct. 25, 1978

[51] Int. Cl.$^2$ .............................................. G02B 5/14
[52] U.S. Cl. .................................. 250/227; 350/96.24
[58] Field of Search ................. 250/227; 219/121 L, 219/121 LM; 350/96.24

[56] References Cited
U.S. PATENT DOCUMENTS

| | | |
|---|---|---|
| 3,739,174 | 6/1973 | Gloge . |
| 3,904,270 | 9/1975 | Cheo . |
| 3,906,221 | 9/1975 | Mercier . |
| 4,037,113 | 7/1977 | Moore . |
| 4,047,795 | 9/1977 | Hughes et al. . |

*Primary Examiner*—David C. Nelms
*Assistant Examiner*—Darwin R. Hostetter
*Attorney, Agent, or Firm*—R. S. Sciascia; A. L. Branning; G. J. Perry

[57] ABSTRACT

An apparatus for the detection of laser beam perforation of a target. A plurality of fiber optic threads are disposed in a grid arrangement behind the target along the anticpated beam sensor line opposite the exposed surface of the target. Upon beam perforation of the target, the laser energy impinges upon the fiber optic threads causing them to produce optical signals and allowing them to behave as light pipes. Groups of these fiber optic threads are gathered together and optically coupled to photo-electrical transducers for generating electrical signals in response to the optical signals generated within the fibers. These electrical signals are detected and recorded to provide accurate information regarding the time and position of laser beam burn through of the target.

7 Claims, 6 Drawing Figures

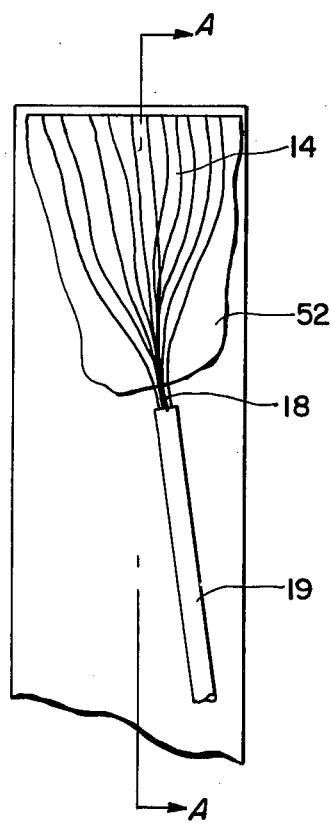
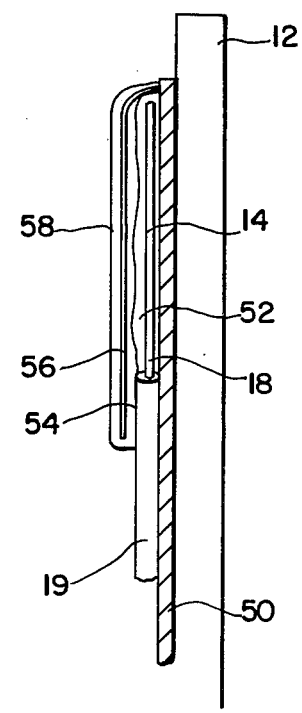
FIG. 3
FIG. 3A
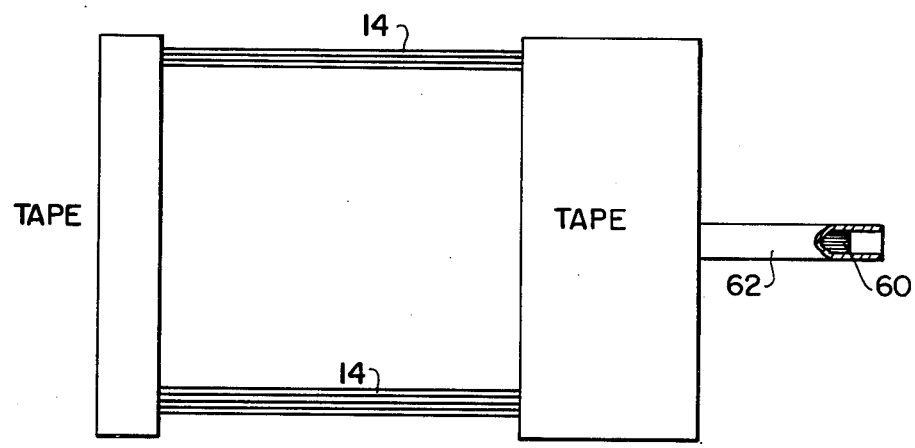
FIG. 4
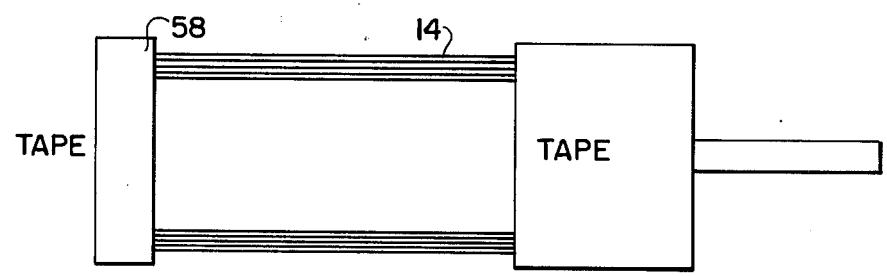
FIG. 4A

FIBER OPTIC LASER BEAM DETECTOR

BACKGROUND OF THE INVENTION

This invention relates generally to testing apparatus for use with lasers and specifically to apparatus for the detection of laser beams that have penetrated a target.

Methods for laser beam penetration of a target currently include the use of thermopile infrared detectors which detect radiation reflected from a surface that is laser illuminated when burn through occurs, thermocouples affixed to the back surface of the target being burned through, and high speed movies. All of these systems fail to provide reliable high speed detection.

Thermopile infrared detectors operate at very low signal levels therefore requiring signal amplification and extensive shielding of signal leads from stray radiation. In addition the individual detectors are expensive and a large number of them are required to cover a substantial size surface area behind the target. In addition, infrared detectors are inherently temperature and vibration sensitive.

Thermocouples, like infrared detectors, operate at very low signal levels consequently requiring high electrical amplification and shielding from stray radiation. The single point coverage of the thermocouple requires the use of arrays of them to cover possible misalignment of a small beam on a large target.

High speed movies lack a simple interpretation scheme that allows the user to record events in chronological order. In addition all of these methods have difficulty in resolving events to under 10 milliseconds in time.

SUMMARY OF THE INVENTION

It is therefore an object of the present invention to provide a laser beam detector for use in determining burn through of a target.

A further object of the present invention is to provide a laser beam detector having a rapid response time.

Another object of the present invention is to provide a laser beam detector that is capable of indicating to the user the precise time of target burn through.

Still another object of the present invention is to provide a laser beam detector that does not require extensive amplification or shielding from its radiation filled environment.

Yet another object of the present invention is to provide a laser beam detector that is inexpensive to produce.

These and other objects of the present invention are achieved by providing a fiber optic laser beam detector. Small glass fiber optic threads are positioned around the expected beam center line on the opposite side of the target from the laser. After the beam penetrates the target and upon emerging from the rear of the target, it irradiates these glass fibers. The laser radiation raises the temperature of these fibers sufficiently to produce intense black body radiation within the fiber. These fibers are gathered in bundles to form multiple fiber light pipes which are coupled to photo-electric transducers which convert the optical signals generated within the fibers to electric signals. These photo-electric transducers are silicon photo-diodes or silicon photo-transistors operated with a low bias voltage and coupled to a to a low resistance load. The resistive load is tapped to produce the required voltage level to drive recording equipment for the accurate recordation of laser beam burn through of the target as a function of time.

BRIEF DESCRIPTION OF THE DRAWINGS

The many attendant advantages of the present invention will be readily apparent as the invention becomes better understood by reference to the following detailed description with the appended claims, when considered with conjunction with the accompanying drawings, wherein:

FIG. 3 and FIG. 3A include side and cross-section views showing the coupling of the fiber optic system to the target.

FIG. 4 and FIG. 4A are pictorial representations showing the optical fibers arranged in a grid.

DETAILED DESCRIPTION OF THE PREFERRED EMBODIMENTS

Figure 1:
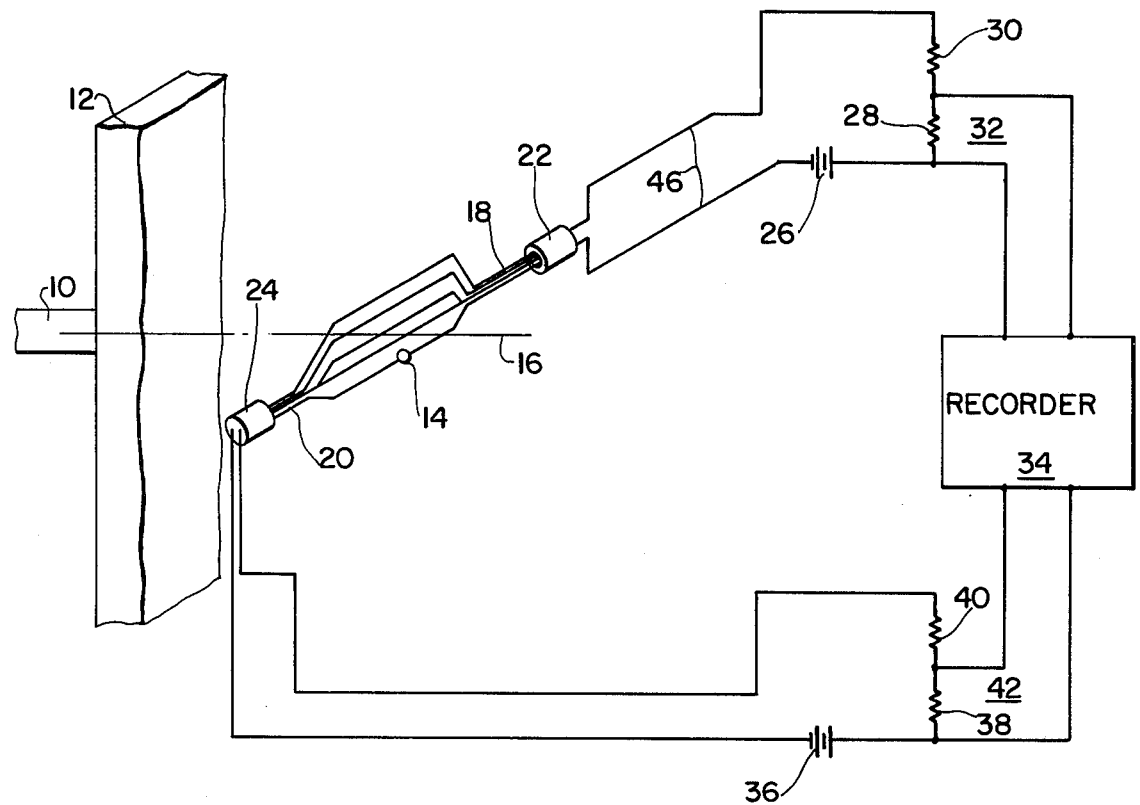
FIG. 1 is a pictorial representation of the fiber optic laser beam detector according to the present invention.

Referring now to FIG. 1 which is pictorial and schematic representation of the fiber optic laser beam detector according to the present invention, the primary objective of the present invention is to detect a laser beam 10 after it has passed through a target 12. Fiber optic threads 14 are positioned around the expected beams centerline 16 such that laser beam 10, after penetrating target 12, will irradiate the threads. This radiation from laser beam 10 raises fiber optic threads 14 to a very high temperature and produces an intense black body radiation within the threads. This radiation in turn produces an optical signal within threads 14. Fiber optic threads 14 are gathered into fiber bundles 18 and 20 to form light pipes adding the optical signals from all of the threads so gathered. Fiber bundles 18 and 20 are optically and mechanically coupled into photoelectric transducers 22 and 24 respectively. Transducers 22 and 24 are photo-transistors requiring a bias voltage for operation. Bias power supply 26 in combination with series resistors 28 and 30 control the appropriate bias level for transducer 22 and allow a convenient tap point 32 for coupling of the transducers circuit to a recorder 34. Likewise, bias power supply 36 in series combination with resistor 38 and 40 provide the appropriate bias level for transducer 24 and further provide a convenient tap off point 42 for coupling to a second channel of recorder 34. Recorder 34 can be an oscillograph or some magnetic recorder means having a rapid enough time response to record accurately the time frame of electrical signals generated by transducers 22 and 24.

As laser beam 10 penetrates target 12, the burn through hole in the target will grow larger and the beam will irradiate more and more fiber optic threads 14. This process will increase the level of optical signals gathered in fiber bundles 18 and 20 which will in turn increase the electrical signals generated by transducers 22 and 24. The response time of recorder 34 should be rapid enough to record these gradations of signal level accurately.

Figure 2:
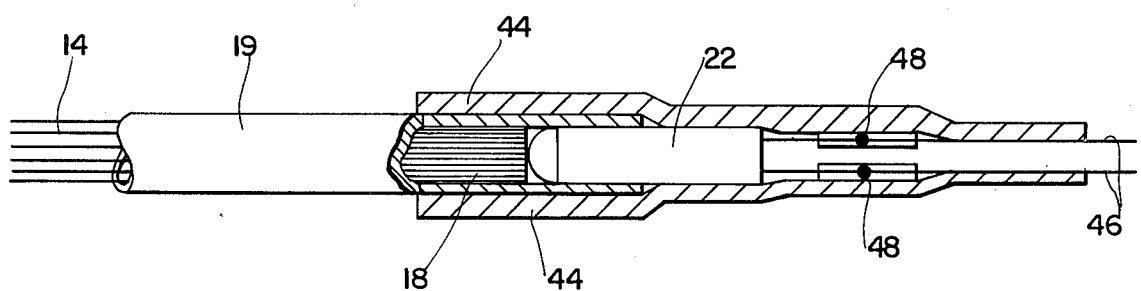
FIG. 2 is a cut away view of the light pipe to photoelectric transducer connection.

Referring now to FIG. 2, there is shown in detail cross-sectional view the optical and mechanical coupling of a fiber bundle to its photo-electric transducer. For convenience, only fiber bundle 18 and photo-electric transducer 22 are pictured. Fiber bundle 20 and photo-electric transducer 24 are identical and therefore not shown in detail. Fiber optic thread 14 is gathered into fiber bundle 18 within light pipe 19 and is ended at window lens of photo-electrical transducer 22. In this manner optical signals propagating in the direction of arrow, will impinge upon the face of transducer element 22. Actual tests conducted utilize a TI-L81 photo-transistor for transducer element 22. Shrink tubing 44 mechanically secures light pipe 19 carrying fiber bundle 18 to the face of transducer element 22. Electrical leads 46 are coupled to transducer element 22 via insulated solder joints 48 before shrink tubing 44 is secured.

Referring now to FIG. 3, there is shown a means for securing fiber optic threads 14 to the back target 12 along expected beam centerline 16. FIG. 3 details the attachment of a single ended system, that is, only one end of fiber optic threads 14 are gathered into a bundle and coupled to a transducer element. FIG. 1, on the other hand, illustrates a dual ended system in which fiber optic threads 14 are gathered into bundles at both ends and coupled to separate transducer elements. Fiber optic threads 14 are spread out over an aluminum plate element 50 abutting target 12. A layer of adhesive 52 is spread over fiber optic threads 14 to secure them to aluminum plate element 50. In actual tests, the adhesive used was Hysol Adhesive Kit 0151. Three layers of fiber glass tape 54, 56, and 58 provide a more secure attachment and light insulation for fiber optic threads 14 beneath them.

In practice, aluminum plate element 50 is 0.86mm (0.032 inches) thick, light pipe 19 has an outside diameter of 3.18 mm and is constructed of plastic, fiber bundle 18 containing 1.9 mm fibers is approximately 0.075 inches in diameter and fiber optic thread 14 are fanned out to cover a span 25 mm in width on aluminum plate element 50. Of course, all of these parameters can be varied to suit a particular test situation and environment.

Referring now to FIG. 4 two typically sized fiber optic laser beam detectors according to the present invention are shown. The upper portion of FIG. 4 shows fiber optic threads 14 approximately 2 ⅜inches long and having an overall spread of 2 ⅜inches to form a square area covered by threads. The left most side of all threads is covered by fiber glass tape to block light entry other than from laser beam 10. The right of threads 14 are coupled to a transducer element 60 through a light pipe 62. In the bottom portion of the FIG. 4 a smaller version of the laser beam detector is shown wherein fiber 14 are spread out over one and quarter inches area. Again a single ended system is shown. These arrays are taped in position where beam is expected and were used where gluing the thread to a component was not possible.

Obviously, other embodiments and modifications of the present invention will readily come to those ordinary skill in the art having the benefit of the teachings presented in foregoing description and drawings.

For example, fiber optic threads 14 can be arranged in various grid and detector formats to produce not only good time resolution, but also a precise definition of the spacial area where penetration of target 12 took place. Furthermore, fiber optic threads 14 could be positioned axially abutting target 12 such that laser beam 10 irradiates the free end of the fibers. Such an axial arrangement would give precise area definition when beam 10 is jittering and when radiation levels are too high for a grid system to differentiate burn through. Other types of photo-electric transducers can be used to promote optimum coupling for various levels of radiation induced by laser beam 10. Smaller or larger sized fiber optic threads 14 can be used to suit experimental resolution of both time and space.

What is claimed and desired to be secured by Letters Patent of the United States is:

1. A laser beam detector for detecting laser burn through of a target comprising:
   a plurality of fiber optic threads deployed behind said target in the region of expected laser beam radiation burn through for producing optical signals in response to laser beam radiation impingement thereon;
   at least one photo-electrical transducer optically coupled to said fiber optic threads producing electrical signals in response to said optical signals; and
   means for detecting said electrical signals corresponding to the presence of laser beam radiation impinging upon said fiber optic threads.

2. The laser beam detector of claim 1 wherein said fiber optic threads are arranged to form a grid in the region of expected laser beam burn through.

3. The laser beam detector of claim 1 wherein said fibers are gathered together to form a plurality of light pipes, each of said pipes coupled to its own photo-electric transducer so that electrical signals produced by said transducers isolate the position of said laser beam radiation target burn through.

4. The laser beam detector of claim 1 wherein said photo-electric transducer is a photo-diode.

5. The laser beam detector of claim 1 wherein said photo-electric transducer is a photo-transistor.

6. A method for detecting laser beam burn through of a target comprising the steps of:
   deploying fiber optic threads behind said target in the region of expected laser beam radiation burn through;
   allowing said threads to be irradiated by said laser energy to be detected, said fiber optic thread generating optical signals in response to said laser irradiation;
   coupling at least one end of each of said fiber optic threads to a photo-electrical transducer element for generating electrical signals in response to said optical signals; and
   detecting said electrical signals corresponding to the presence of said laser beam energy having burned through said target to impinge upon said fiber optic threads.

7. The method of claim 6 wherein said coupling step includes;
   gathering together groups of said fiber optic threads;
   tightly binding said thread groups into light pipe bundles thereby cumulating said optical signals from each of said fiber optic threads within said bundles; and
   optically coupling each of said bundles to a photo-electrical transducer element for generating an electrical signal in response to each of said optically cumulated signals.

* * * * *